Figure 1:
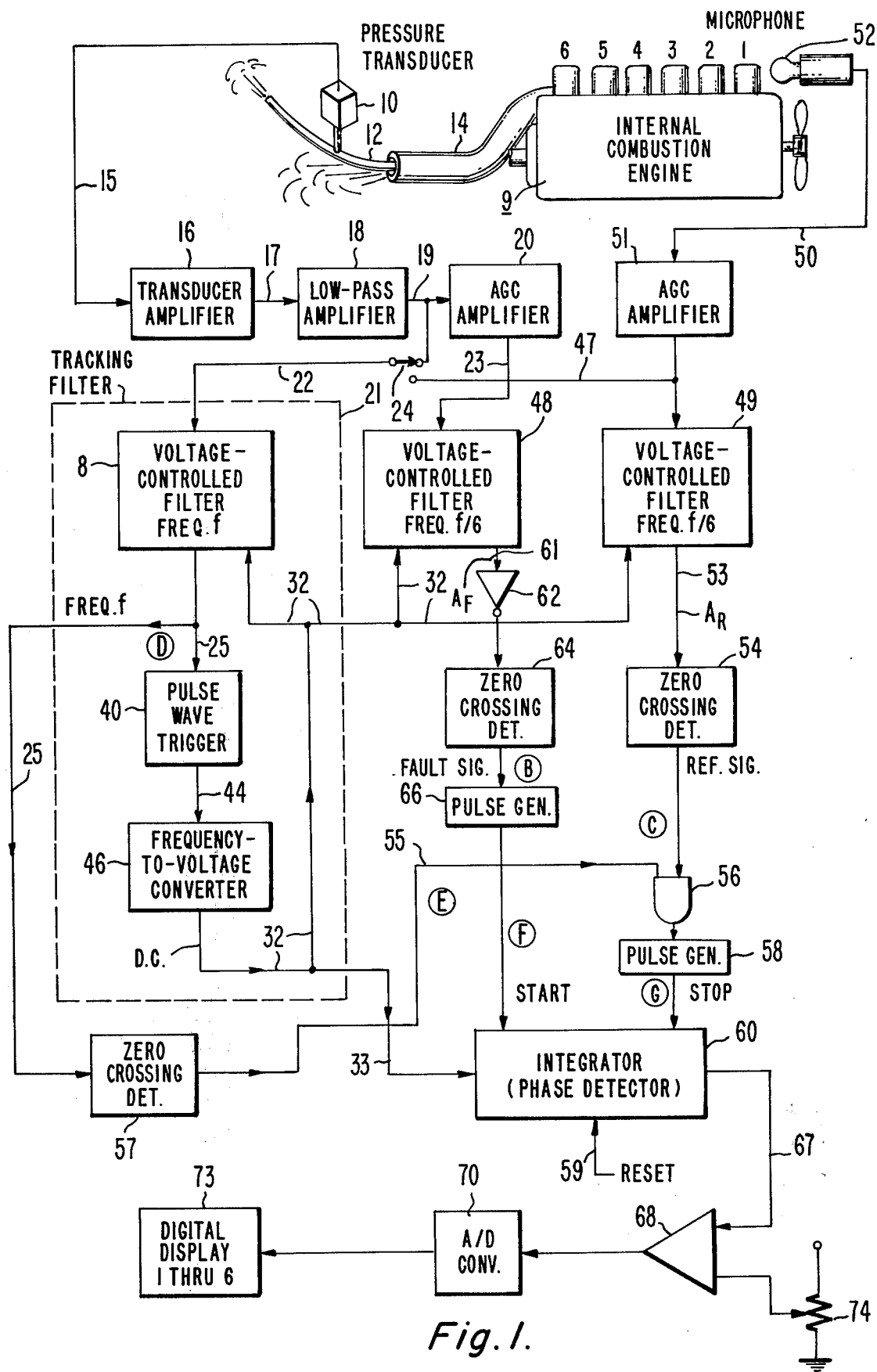

United States Patent [19]

Hulls et al.

[11] 4,133,205
[45] Jan. 9, 1979

[54] IDENTIFICATION OF ENGINE CYLINDER HAVING FAULT

[75] Inventors: Leonard R. Hulls, Marblehead; Stephen C. Hadden, Acton, both of Mass.

[73] Assignee: RCA Corporation, New York, N.Y.

[21] Appl. No.: 854,834

[22] Filed: Nov. 25, 1977

[51] Int. Cl.$^2$ .......................................... G01M 15/00
[52] U.S. Cl. ................................................. 73/117.3
[58] Field of Search ........................ 73/116, 117.3, 115

[56] References Cited

U.S. PATENT DOCUMENTS

| | | | |
|---|---|---|---|
| 2,082,030 | 6/1937 | Schrader et al. | 73/115 |
| 3,777,559 | 12/1973 | Rennick et al. | 73/117.3 |
| 3,977,239 | 8/1976 | Hulls et al. | 73/115 |

*Primary Examiner*—Jerry W. Myracle
*Attorney, Agent, or Firm*—H. Christoffersen; Samuel Cohen; Carl V. Olson

[57] ABSTRACT

The cylinder of an internal combustion engine having a fault is identified by using a non-contacting transducer to generate a reference engine-cycle electrical signal having a phase determined by a reference one of the cylinders of the engine, and by using a non-contacting transducer to generate a fault engine-cycle electrical signal having a phase determined by the one of the cylinders having a fault. The phase difference between the fault electrical signal and the reference electrical signal is translated to a number identifying the cylinder having the fault.

10 Claims, 2 Drawing Figures

IDENTIFICATION OF ENGINE CYLINDER HAVING FAULT

Diagnostic apparatus for internal combustion engines has, in the past, necessarily included means for making electrical and mechanical connections to an engine to measure engine speed, ignition timing, compression, etc. Now it has been found possible to measure engine speed, without making any electrical or mechanical connections to the engine, by means including a non-contacting transducer for sensing pressure variations at the end of the engine exhaust pipe due to explosions in individual cylinders of the engine. Such apparatus is described in U.S. Pat. No. 3,978,719 issued on Sept. 7, 1976 to S. C. Hadden, et al., and entitled, "Tachometer Without Physical Connection to Internal Combustion Engine" and U.S. Pat. No. 3,978,416 issued on Aug. 31, 1976, to E. M. Sutphin, Jr. and entitled, "Filter Which Tracks Changing Frequency of Input Signal." Apparatus for determining the evenness or unevenness of power strokes from individual cylinders, without requiring electrical or mechanical connections to the engine, is described in U.S. Pat. No. 3,977,239 issued on Aug. 31, 1976 to L. R. Hulls, et al., and entitled, "Engine Diagnosis From Frequency Components in Exhaust" and in U.S. Pat. No. 4,032,852 issued on June 28, 1977, to L. R. Hulls, et al., and entitled, "Filter Which Tracks Changing Freqency of Input Signal." The present invention relates to apparatus for identifying which one cylinder in an engine is faulty in operation, for the purpose of localizing the part of the engine which requires repair or adjustment.

According to the invention, the cylinder of an internal combustion engine having a fault is identified by determining the phase difference between a reference electrical signal having an engine cycle reference phase, and a fault electrical signal having a phase determined by the one of the cylinders having a fault, at least the fault signal being derived from a transducer which is not in electrical or physical contact with the engine.

Figure 2:
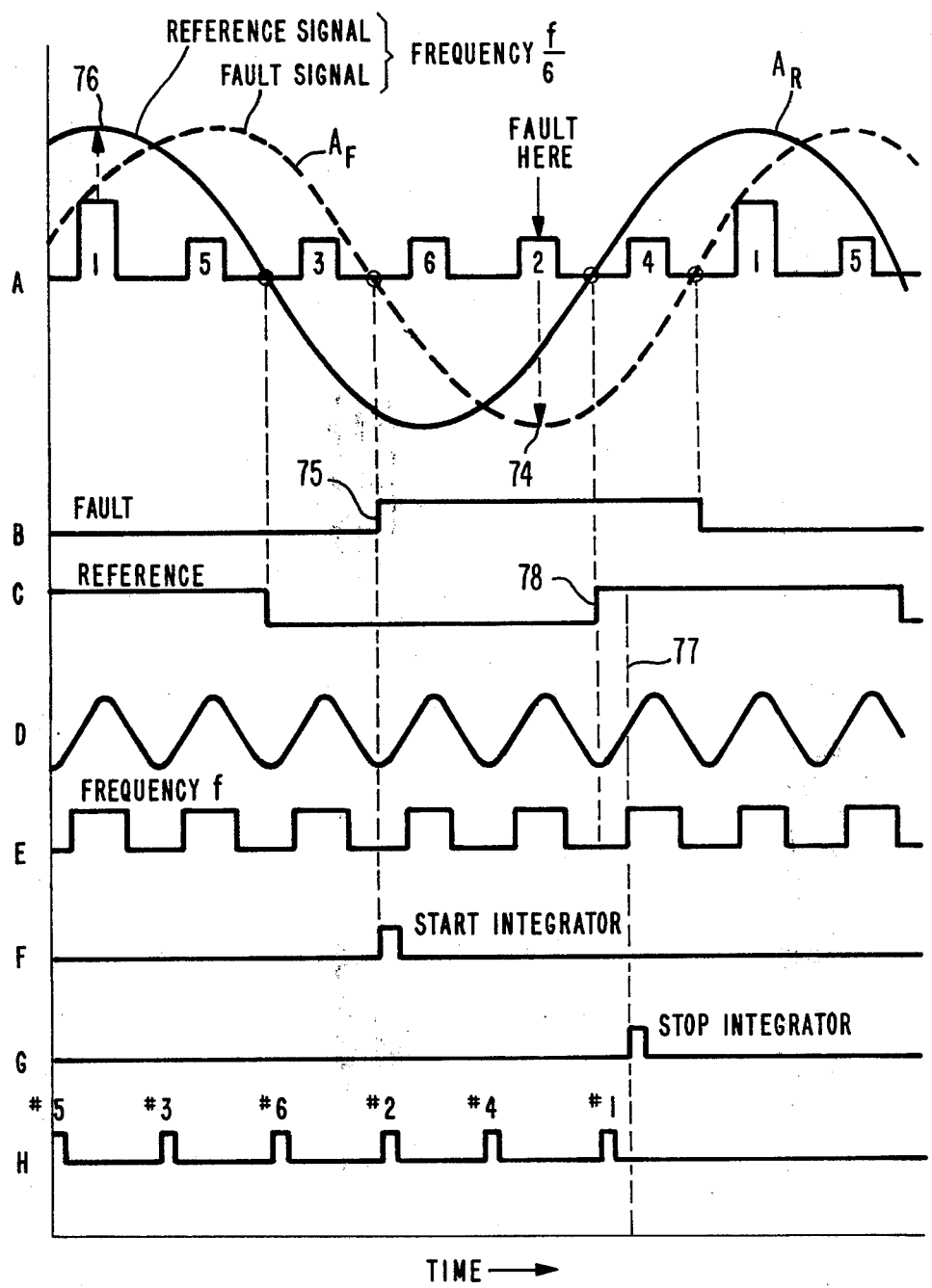

In the drawing:

FIG. 1 is a block diagram of a system constructed according to the teachings of the invention for identifying an engine cylinder having a fault; and FIG. 2 is a chart of waveforms which will be referred to in describing the operation of the system of FIG. 1.

Referring now in greater detail to the drawing, FIG. 1 shows the overall diagnostic apparatus for use with an internal combustion engine 9 having an exhaust pipe 14, or oil filler pipe, or crankcase breather opening. A pressure transducer 10, which may be a variable-reluctance pressure transducer Model DP15 manufactured by Validyne Engineering Corporation of Northridge, California 91324, responds to pressures ranging between −1 and +1 pounds per square inch, and is mounted at the center of a metal tube 12 which is 20 inches long and ½ inch in inside diameter. The tube 12 is curved slightly, to allow the pressure transducer 10 to be located out of the exhaust stream when the tube is inserted about three inches into the open end of the exhaust pipe 14 of the engine 9. The transducer 10 is not in physical contact with the engine 9.

According to the alternative mode of operation, the transducer tube 12 is inserted a short distance into the air intake of the engine. The system can operate on either the exhaust pressure, the intake pressure, or the crankcase pressure variations of an internal combustion engine.

The pressure transducer 10 is applied with alternating-current excitation from a transducer amplifier 16 over a cable 15. The electrical signal having an amplitude varying with pressure, which is produced by the transducer 10, is applied in the reverse direction over cable 15 to the amplifier 16. The amplifier 16, which may be a Model CD12 transducer indicator manufactured by Validyne Engineering Corporation, together with transducer 10, responds to pressure variations having a frequency range from zero to 1000 Hertz. The prominent fundamental speed-indicating frequency component in the exhaust of an engine may range from 20 Hz at a low engine speed to as high as 200 Hz at a high engine speed. The signal from transducer amplifier 16 in FIG. 1 is applied over line 17 to a low-pass amplifier 18, which may include two operational amplifiers constituted by a Motorola Corporation MC1558 integrated circuit unit.

The output of low-pass amplifier 18 is applied over line 19 to the input of an automatic gain control (AGC) circuit 20, and through switch 24 to the input of a tracking filter 21. The AGC circuit 20 may, for example, be a circuit as described in U.S. Pat. No. 3,995,224 issued on Nov. 30, 1976, to E. M. Sutphin, Jr., and entitled, "Fast Automatic Gain Control Circuit With Adjustable Range." The tracking filter 21 may be as described in U.S. Pat. No. 4,032,852 issued on June 28, 1977, to L. R. Hulls, et al., and entitled, "Filter Which Tracks Changing Frequency of Input Signal." The tracking filter includes a voltage-controlled filter 8 having a signal input terminal 22 and a signal output terminal 25. The output of filter 8 is applied through a pulse wave trigger 40 to a frequency-to-voltage converter 46, which produces a control voltage at 32 having an amplitude proportional to the cylinder firing frequency f, which in turn is proportional to the speed of the engine. The engine runs at a constant speed during the test to be described, and consequently the control voltage at 32 has a constant value.

The output of the AGC amplifier 20 is applied over line 23 to the input of a voltage-controlled filter 48, which is receptive to the control voltage over line 32 from the frequency-to-voltage converter 46. The control voltage is also applied to a similar voltage-controlled filter 49. Both filters 48 and 49 are tuned to a frequency f/n where f is the cylinder firing frequency, and n is the number of cylinders in the engine, so that f/n is the engine-cycle frequency.

The voltage-controlled filter 49 is receptive to a signal over line 50 and through an AGC amplifier 51 from a transducer 52 which is shown to be positioned close to cylinder #1 of an internal combustion engine 9, but not in physical contact with the engine. The transducer may be a pressure-to-electrical transducer, and may be a microphone responsive to sound (noise) due to explosions in the nearby reference cylinder, or a vibration transducer responsive to vibrations due to engine parts associated with the nearby reference cylinder which may be conducted through engine parts. The output of filter 49 is a reference engine-cycle sine wave waveform which is applied through a zero crossing detector 54, and "and" gate 56, and a pulse generator 58 to the STOP input of an integrator 60. The "and" gate 56 also receives an input over line 55 from a zero crossing detector 57 which receives a signal at the cylinder firing frequency f from the voltage-controlled filter 8.

The output of filter 48 is a fault engine-cycle sine wave waveform which is applied through an inverter 62 and a zero crossing detector 64 and a pulse generator 66 to the START input of an integrator 60. The integrator 60 integrates the constant-with-engine-speed voltage at the output 32 of the frequency-to-voltage converter 46 during the interval between a START pulse and a STOP pulse. The integrated voltage increases until the STOP pulse halts the integration. The maximum voltage reached is held and maintained at the output 67 of the integrator until the integrator is reset at 59. The output signal from the integrator accurately indicates the phase difference between the fault and reference waves at any constant engine speed. This is because, while the time between START and STOP pulses is less at higher engine speeds, the amplitude of the input signal at 33 being integrated is proportionally larger.

The output of integrator 60 is coupled through an operational amplifier 68 to an analog-to-digital converter 70 which provides an output to operate a digital display 73. The voltage divider 74 at the reference input of the operational amplifier 68 is adjustable to compensate for a constant phase difference between the reference engine-cycle waveform and the fault engine-cycle waveform which may be present due to engine geometry, transducer placement, the delay between generation of pressure pulses in the exhaust manifold and the detection of the pulses at the exhaust pipe exit, or other factors.

In the operation of the system of FIG. 1, the engine is operated at an idle or normal operating speed, the pressure transducer 10 is placed in the exhaust pipe 14 or the breather or oil-filler opening of the engine 9 to produce an electrical signal having a frequency component at the cylinder-firing frequency f, and the transducer 52 is positioned near one cylinder of the engine 9 to produce an electrical signal having a frequency component at the engine cycle frequency f/6.

The pressure pulsations impinging on the transducer 10 produce a corresponding electrical wave which is amplified in transducer amplifier 16. The low pass amplifier 18 and the AGC amplifier translate the signal to a wave of constant peak amplitude. The amplified wave at 19 is applied to the input of the variable-Q voltage-controlled filter 8 in the tracking filter 21. The filter has a narrow frequency pass band which passes a prominent cylinder firing frequency component f that varies directly with engine speed, and which rejects or attenuates other disturbing frequency components. The output at 25 is, therefore, a relatively clean sine wave, which is translated to a square wave in pulse wave trigger 40. The frequency of the square wave at 44 is translated to a proportional voltage in frequency-to-voltage converter 46. The output of converter 46 is fed back over line 32 to the frequency control input of the voltage-controlled filter 8 to make the filter lock onto and track a changing input signal frequency which changes due to changes in engine speed.

According to an alternative mode of operation, the tracking filter 21 may have an input 21 connected through switch 24, line 47, AGC amplifier 51 and line 50 to the microphone 52. That is, the tracking filter 21 can derive an output control signal at 32 from signals provided by microphone 52, or from signals provided by pressure transducer 10.

The amplitude-controlled signal from AGC amplifier 20 is applied over line 23 to the input of voltage-controlled filter 48. The filter 48 passes the engine cycle frequency which is f/n, where f is the cylinder firing frequency and n is the number of cylinders in the engine, n being 6 in the present example.

The signal on lead 61 from the voltage-controlled filter 48 is a fault signal shown as $A_F$ in FIG. 2. The fault signal has an engine cycle frequency f/6 and has a phase determined by a fault in cylinder No. 2 in the example illustrated. The fault causes a negative maximum at 74 at the time when cylinder No. 2 is making an exhaust stroke. The fault signal $A_F$ is passed through inverter 62 to zero crossing detector 64 which translates the fault sine wave $A_F$ to a fault square wave B in FIG. 2. The positive leading edge 75 of the fault square wave signal causes a pulse wave F from the pulse generator 66 which is applied as a START signal to the integrator 60.

The signal on lead 53 from the voltage-controlled filter 49 is a reference signal shown as $A_R$ in FIG. 2 having an engine cycle frequency f/6 and having a phase determined by the physical location of transducer 52 near one cylinder, No. 1 in the example. The reference signal $A_R$ has a maximum at 76 when cylinder No. 1 produces a power stroke. The reference signal $A_R$ is applied to a zero crossing detector 54 which translates the reference sine wave $A_R$ to a reference square wave C in FIG. 2. Wave C is applied to one input of "and" gate 56. The other input to "and" gate 56 is a cylinder-firing frequency square wave E in FIG. 2 at frequency f, which is generated by zero crossing detector 57 from the cylinder firing frequency sine wave D. At time 77, following the leading edge 78 of wave C, when a leading edge of wave E occurs, the "and" gate 56 is enabled to pass a signal to pulse generator 58 which generates the STOP pulse G applied to integrator 60. The leading edge of wave E is used to time the stopping of the integrator because it has a stable predictable timing, whereas the timing of leading edge 78 of wave C may be subject to jitter.

The integrator 60 integrates the constant voltage proportional to engine speed supplied to it over lines 32 and 33 from the frequency-to-voltage converter 46. The output of integrator 60 is a signal having an amplitude determined solely by the phase difference between the reference wave $A_R$ and the fault wave $A_F$. The output is not affected by the speed of the engine at the time of the test. This is because, while at higher engine speeds the time between the START and STOP pulses is less, the voltage supplied to the input of the integrator at 33 is proportionately greater.

The output at 67 from integrator 60 is applied through an amplifier 68 and an analog-to-digital converter 70 to a digital display unit 73 which displays a number 1 through 6 identifying the cylinder having a fault. The waveforms in FIG. 2 illustrate the conditions when the fault is in cylinder No. 2. Waveform H in FIG. 2 illustrates the timing of the START pulses for faults in respective identified ones of cylinders #1 through #6. The time difference between START and STOP pulses is a minimum when the fault is in cylinder #1, is a maximum when the fault is in cylinder #5, and has intermediate values for other cylinders. The analog-to-digital converter 70 converts the signal from the integrator representing the time delay between START and STOP pulses to a digital signal representing the number of the cylinder having the fault.

In the embodiment of the invention shown in FIG. 1 the tracking filter tracks the cylinder firing frequency f and measures the phase difference between the reference and fault signals at frequency f/6 by employing the signal at frequency f as a gating signal. It will be appreciated by those skilled in the art that the invention may be implemented by tracking any frequency component in either the fault or reference signal, and that any component of the reference signal which is higher in frequency than the engine cycle frequency may be used for gating the STOP pulse.

What is claimed is:

1. Means for identifying the cylinder of an internal combustion engine having a fault, comprising
    means including a reference transducer to produce a reference engine-cycle sine wave electrical signal having a phase determined by the position of the transducer with relation to a reference one of the cylinders of the engine,
    means including a non-contacting fault transducer to produce a fault engine-cycle sine wave electrical signal having a phase determined by the one of the cylinders having a fault,
    means to detect the phase difference between said fault electrical signal and said reference electrical signal, and
    means to translate said phase difference to an indicia identifying the cylinder having the fault.

2. The invention as defined in claim 1 wherein said fault transducer is a pressure-to-electrical transducer.

3. The invention as defined in claim 1 wherein said means to produce a fault engine-cycle electrical signal includes a voltage-controlled filter passing a cylinder firing frequency signal at frequency f, and a voltage-controlled filter passing an engine-cycle signal at a frequency f/n, where n is the number of cylinders of the engine.

4. The invention as defined in claim 3 wherein said means to produce a reference engine-cycle electrical signal includes a second voltage-controlled filter passing an engine-cycle signal at said frequency f/n.

5. The invention as defined in claim 4 wherein said means to detect the phase difference between said reference signal and said fault signal comprises an integrator.

6. The invention as defined in claim 5 wherein said integrator is started and stopped by signals derived from said fault and reference signals.

7. The invention as defined in claim 6 wherein said integrator integrates a voltage which varies with engine speed, whereby the detected phase difference is independent of engine speed.

8. The invention as defined in claim 7 wherein said means to translate said phase difference to a cylinder number includes an analog-to-digital converter.

9. The method of identifying the cylinder of an internal combustion engine having a fault, comprising the steps of:
    employing a reference transducer to produce a reference engine-cycle sine wave electrical signal having a phase determined by the position of the transducer with relation to a reference one of the cylinders of the engine,
    employing a non-contacting fault transducer to produce a fault engine-cycle sine wave electrical signal having a phase determined by the one of the cylinders having a fault,
    detecting the phase difference between said fault electrical signal and said reference electrical signal, and
    translating said phase difference to a number identifying the cylinder having the fault.

10. The method of identifying the one of the cylinders having a fault in a multiple cylinder internal combustion engine, comprising the steps of:
    producing a reference engine-cycle sine wave electrical signal having a phase indicative of the firing of a particular one of the cylinders of the engine,
    producing, without contacting the engine, a fault engine-cycle sine wave electrical signal having a phase indicative of said one of the cylinders having a fault, and
    detecting the phase difference between said fault electrical signal and said reference electrical signal, said phase difference being indicative of the cylinder having the fault.

* * * * *